United States Patent [19]

Isaji

[11] Patent Number: 5,884,856
[45] Date of Patent: Mar. 23, 1999

[54] METHOD AND SYSTEM FOR RECLAIMING AGGREGATE FROM CONCRETE WASTE MATERIAL

[75] Inventor: Kazutoshi Isaji, Nagoya, Japan

[73] Assignees: Shinwa Plant Kikou Co., Ltd., Nagoya; Kawasaki Jukogyo Kabushiki Kaisha, Koke; Rasa Industries, Ltd., Tokyo; Kyoboshi Co., Ltd., Hirakata, all of Japan

[21] Appl. No.: 974,169

[22] Filed: Nov. 19, 1997

Related U.S. Application Data

[62] Division of Ser. No. 586,463, Jan. 11, 1996, Pat. No. 5,699,969.

[30] Foreign Application Priority Data

Jan. 10, 1995 [JP] Japan ......................................... 7-18615
Dec. 28, 1995 [JP] Japan ....................................... 7-352833

[51] Int. Cl.$^6$ .................................................. B02C 19/12
[52] U.S. Cl. ........................ 241/76; 241/79.1; 241/152.2; 241/228
[58] Field of Search .................................. 241/24.12, 29, 241/79.1, DIG. 38, 24.1, 152.2, 79, 77, 76, 78, 228

[56] References Cited

U.S. PATENT DOCUMENTS 1,997,031  4/1935  Allswede .

FOREIGN PATENT DOCUMENTS 0548491  6/1993  European Pat. Off. .
5-170498  7/1993  Japan .
1255206  9/1986  U.S.S.R. .

OTHER PUBLICATIONS

W. Beenken, "Mineral Processing Technology: The Key to Recycling", Aufbereitungs–Technik, Dec. 1992, No. 12, pp. 665–672.

"Stitching Centrum voor Regelgeving en Onderzoek in de Grond–, Water–e Wgenbouw en de Verkeerstechniek", Resten Zijn Geen Afval (Meer), Oct. 1988.

*Primary Examiner*—Mark Rosenbaum
*Attorney, Agent, or Firm*—Pillsbury Madison & Sutro LLP

[57] ABSTRACT

A method and system for reclaiming aggregate from concrete waste material includes crushing step and means of compression-crushing lumps of concrete waste material into a crushed mixture, and sorting the crushed mixture by size thereof, grinding step and means of rotating the crushed mixture sorted to grind it with a grinding member which rotates in an opposite direction to the rotating direction of the crushed mixture sorted, thereby peeling mortar from gravel, crushed stones and sand of the crushed mixture to obtain a mixture of gravel, crushed stones, sand, cement and mortar, and product separating step and means of separating the mixture of gravel, crushed stones, sand, cement and mortar into gravel and crushed stones, sand, cement and mortar.

12 Claims, 7 Drawing Sheets

METHOD AND SYSTEM FOR RECLAIMING AGGREGATE FROM CONCRETE WASTE MATERIAL

This is a divisional of application Ser. No. 08/586,463 filed Jan. 11, 1996, which has issued as U.S. Pat. No. 5,699,969.

BACKGROUND OF THE INVENTION

1. Field of the Invention

The present invention relates to a method for reclaiming aggregate from concrete waste material and a system therefor, which are capable of separating high quality aggregate such as gravel, crushed stones and sand from concrete waste material produced in construction sites to reclaim the same.

2. Description of the Related Art

Conventionally, concrete waste lumps produced in construction cites have been crushed and recycled as roadbed material or back filling material. However, they have only limited uses, so, the concrete waste lumps which had not been recycled have been abandoned. This causes a problem in the disposal of industrial wastes.

The above concrete waste lumps include aggregate such as gravel, crushed stones and sand, unreacted cement or the like, which cause difficulty in recycling the concrete waste lumps. To overcome this difficulty, sufficient removal of mortar attached to aggregate is required. This requirement, however, has not been satisfied as yet so that effective recycle of the aggregate, unreacted cement, or the like has not been performed up to the present.

To solve these problems, there have been proposed several methods. One example of these methods is disclosed in Japanese Patent application laid-open No. Hei 5-170498. With this method, concrete waste lumps are compression-crushed and sorted by size thereof, and then dry-crumbled and re-crushed at high density under high pressure to peel mortar from aggregate of the concrete waste lumps and separate mortar from the aggregate. However, only by the dry-crumbling technique, mortar cannot be peeled from the aggregate sufficiently, whereby the resultant aggregate do not conform to a legal standard. To conform the resultant aggregate to the legal standard, it must be mixed with a virgin material. This makes it difficult to reclaim high quality aggregate such as gravel, crushed stones and sand, which is solely usable, so as to cause various problems.

SUMMARY OF THE INVENTION

It is an object of the present invention to provide a method for reclaiming high quality aggregate comforming to a legal standard from a concrete waste material by sufficiently removing mortar attached to the aggregate, and a system therefor.

The method in accordance with the present invention includes a crushing step of compression-crushing concrete waste lumps into a crushed mixture, and sorting the crushed mixture by size thereof, a grinding step of rotating the crushed mixture sorted to grind the crushed mixture, thereby peeling mortar from aggregate included in the crushed mixture to obtain a mixture of aggregate and mortar, and sorting the mixture of aggregate and mortar into a mixture of gravel, crushed stones and mortar and a mixture of sand, cement and mortar, and a product separating step of separating the mixture of gravel, crushed stones and mortar and the mixture of sand, cement and mortar into gravel, crushed stones, sand, cement and mortar.

Preferably, in the crushing step, the crushed mixture is sorted into a mixture of gravel and crushed stones and a mixture of sand and cement, and the grinding step preferably includes a first grinding step of rotating the mixture of gravel and crushed stones crushed and sorted in the crushing step to grind the mixture, thereby peeling mortar from gravel and crushed stones, and a second grinding step of rotating the mixture of sand and cement crushed and sorted in the crushing step to grind the mixture, thereby peeling mortar from sand.

The product separating step preferably includes a first separating step of separating the mixture of gravel, crushed stones and mortar into gravel, crushed stones and mortar, and a second separating step of separating the mixture of sand, cement and mortar into sand, cement and mortar.

In the first separating step, the mixture of gravel, crushed stones and mortar is separated by size thereof based on the difference in gravity therebetween. In a preferred embodiment, the mixture of gravel, crushed stones and mortar is separated by applying vibrations. In another preferred embodiment, the mixture of gravel, crushed stones and mortar is separated by applying pressures.

In the second separating step, the mixture of sand, cement and mortar is separated by rotating the mixture.

The system in accordance with the present invention includes crushing means of compression-crushing concrete waste lumps into a crushed mixture and sorting the crushed mixture by size thereof, grinding means of rotating the crushed mixture sorted to grind the crushed mixture, thereby peeling mortar from aggregate included in the crushed mixture to obtain a mixture of aggregate and mortar, and sorting the mixture of aggregate and mortar into a mixture of gravel, crushed stones and mortar and a mixture of sand, cement and mortar, and product separating means for separating the mixture of gravel, crushed stones and mortar and the mixture of sand, cement and mortar into gravel, crushed stones, sand, cement and mortar.

Preferably, the crushing means sorts the crushed mixture into a mixture of gravel and crushed stones and a mixture of sand and cement, and the grinding means includes first grinding means of rotating the mixture of gravel and crushed stones crushed and sorted by the crushing means to grind the mixture, thereby peeling mortar from gravel and crushed stones, and second grinding means of rotating the mixture of sand and cement crushed and sorted by the crushing means to grind the mixture, thereby peeling mortar from sand.

The product separating means includes first separating means of separating the mixture of gravel, crushed stones and mortar into gravel, crushed stones and mortar, and second separating means of separating the mixture of sand, cement and mortar into sand, cement and mortar.

The grinding means is composed of at least two grinding devices, each having a tubular rotary main body.

In a preferred embodiment, the grinding device further has a grinding member such as rods and balls, which are movably provided within the tubular rotary main body. In another preferred embodiment, the grinding device further has a grinding member composed of a rotary body provided within the tubular rotary main body in eccentric relation therewith so as to rotate in a direction opposite to that of the tubular rotary main body. The rotary body has in an outside face thereof a plurality of longitudinal extending plate-shaped projections which respectively face a plurality of longitudinal extending plate-shaped projections formed in an inside face of the tubular rotary main body.

The first product separating means is composed of at least one gravity sorting device which separates the mixture of gravel, crushed stones and mortar based on the difference in gravity therebetween by applying vibrations or pressures.

The second product separating means is composed of a spiral classifier of separating sand, cement and mortar from each other by rotating spiral vanes of the spiral classifier.

In a preferred embodiment, the tubular rotary main body has an inlet opening and an outlet opening at axially facing positions thereof, and a cylindrical side wall thereof is tapered to the outlet opening such that the diameter of the tubular rotary main body decreases towards the outlet opening. In another preferred embodiment, the tubular rotary main body has an inlet opening and an outlet opening at axially facing positions thereof, and an adjusting plate capable of varying the opening area of the outlet opening is provided along the outlet opening.

Furthermore, in the grinding step and means, a plurality of grinding devices can be used in accordance with the sizes of the aggregate to peel mortar therefrom with certainty, and in the product separating step and means, a plurality of sorting devices can be used in series to sort mortar and aggregate with certainty.

With the present invention, since the crushed mixture is ground by rotating it, mortar can be sufficiently peeled from aggregate such as sand, gravel and crushed stones, whereby high quality aggregate free from a large amount of mortar attachment, which conforms to the legal standard, can be reclaimed.

In the preferred embodiment where the grinding member such as rods and balls is used, the crushed mixture is ground between the tubular rotary main body of the grinding device and the grinding member so that mortar can be peeled from the aggregate such as sand, gravel and crushed stones with certainty.

In the preferred embodiment where the grinding member composed of the rotary body which is disposed within the tubular rotary main body of the grinding device in eccentric relation therewith and has longitudinally extending projections facing those of the main body is used, the crushed mixture is ground between the rotating main body and the rotary body which is rotated in eccentric relation with the rotating main body so that mortar can be peeled from aggregate with more certainty.

In the preferred embodiment where in the first product separating step and means, vibrations are applied to the mixture of gravel, crushed stones and mortar, they can be separated from each other based on the difference in gravity therebetween.

In the preferred embodiment where in the first product separating step and means, pressures are applied to the mixture of gravel, crushed stones and mortar, they can be separated from each other based on the difference in gravity therebetween.

Other objects, features, and characteristics of the present invention will become apparent upon consideration for the following description and the appended claims with reference to the accompanying drawings, all of which form a part of this specification.

DETAILED DESCRIPTION OF THE PRESENTLY PREFERRED EXEMPLARY EMBODIMENTS

Figure 1:
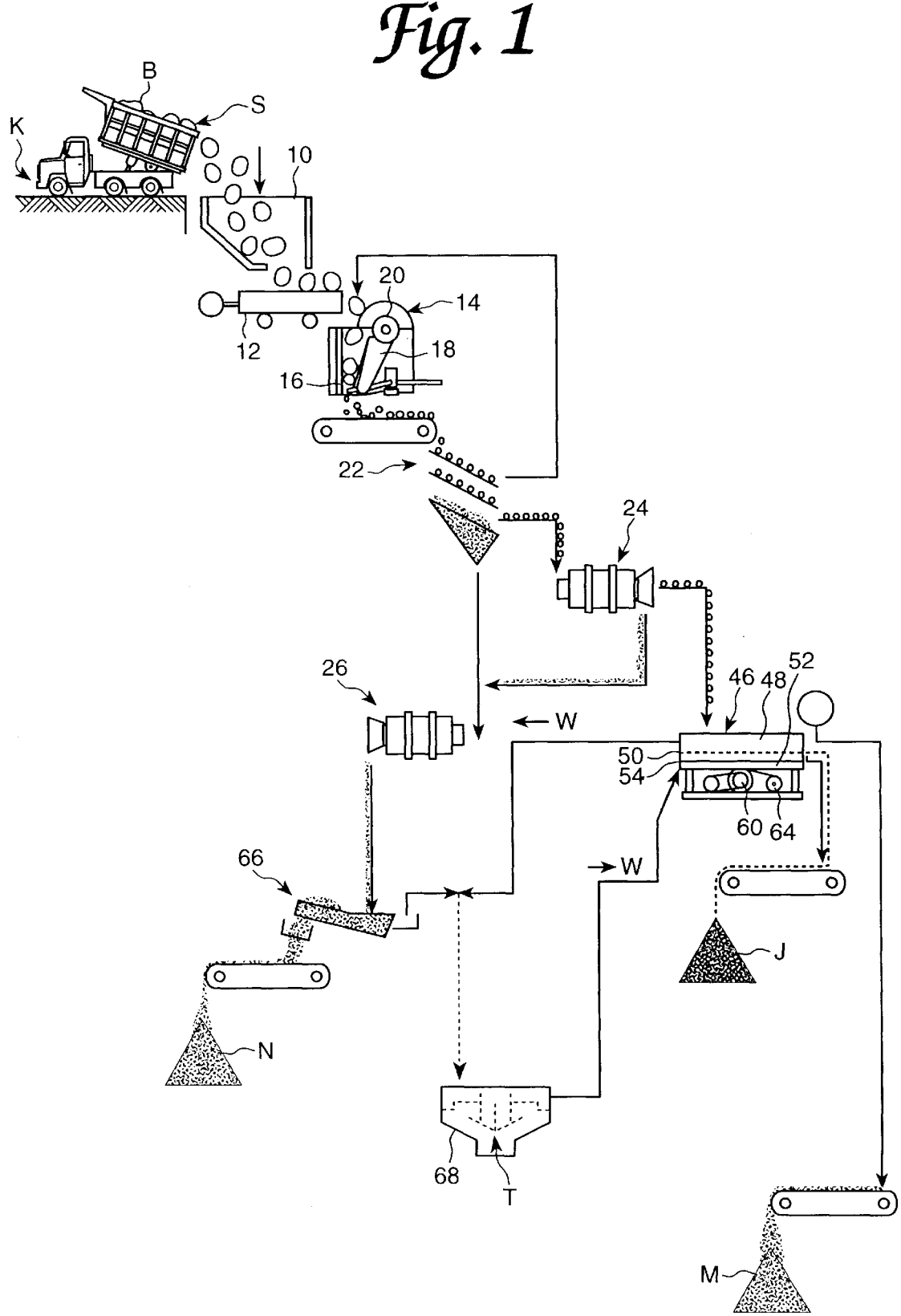
FIG. 1 is a flow diagram illustrating a first embodiment of a method and system in accordance with the present invention.
Figure 2:
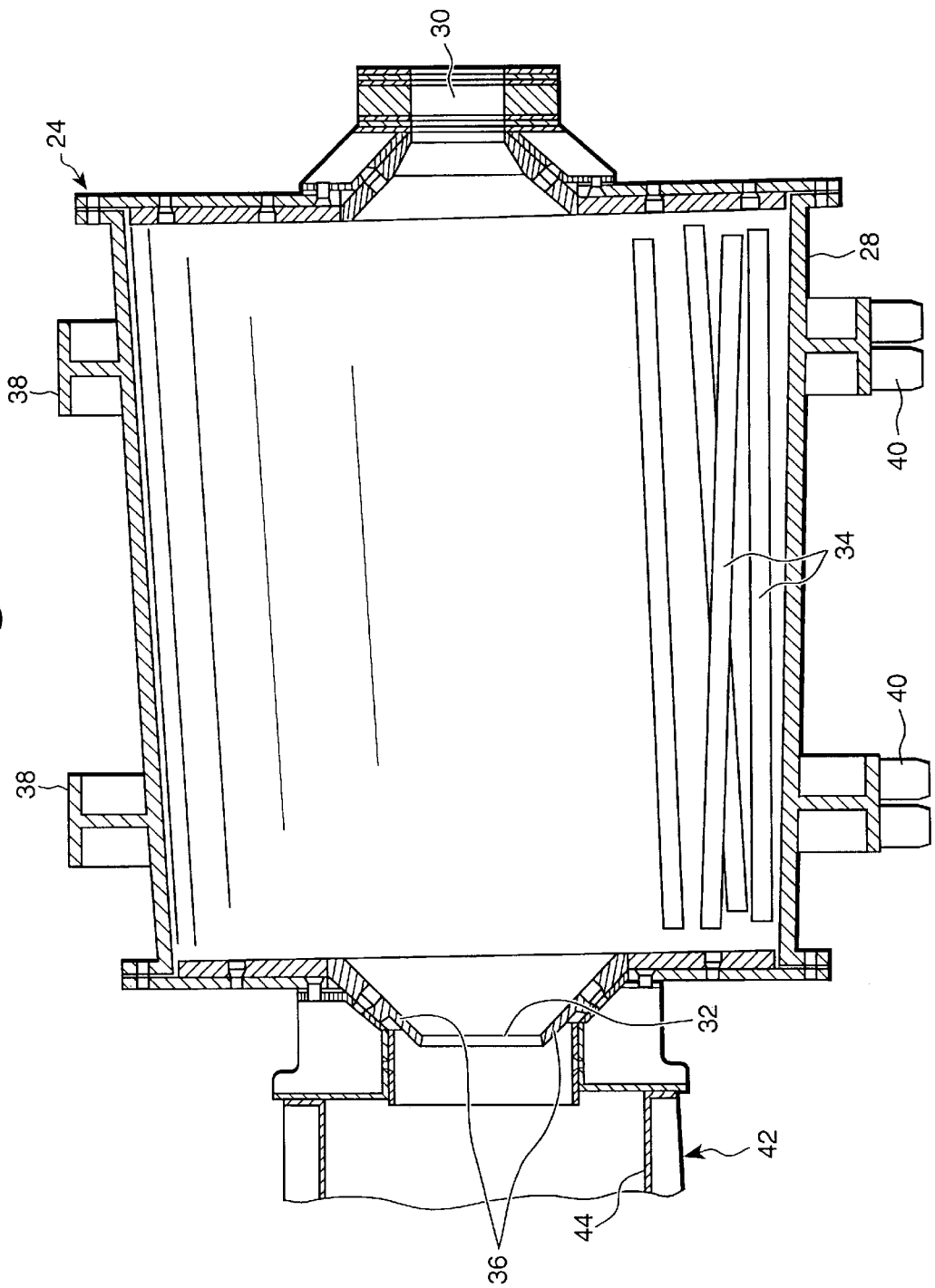
FIG. 2 is a partly broken side elevational view of a grinding device used in the first embodiment.
Figure 3:
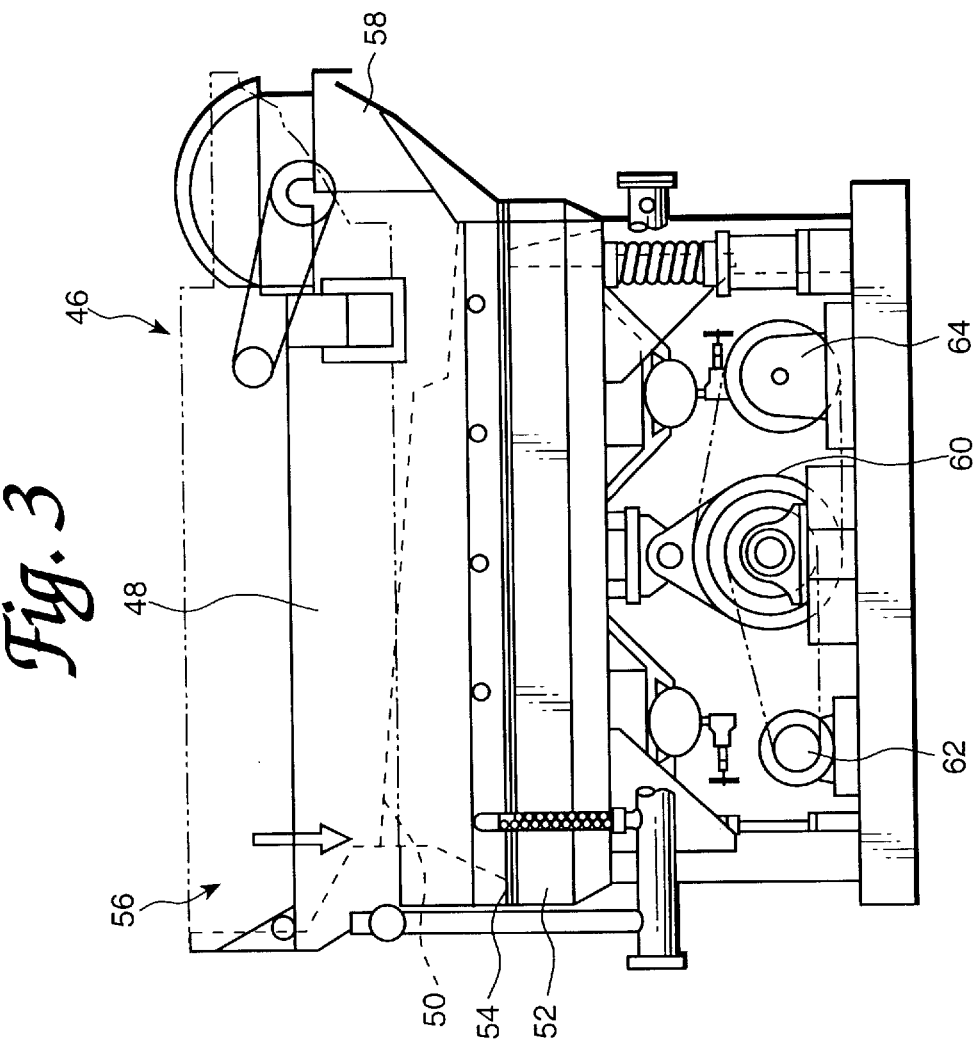
FIG. 3 is a side elevational view of a gravity sorting device used in the first embodiment.

FIGS. 1 to 3 illustrate a first embodiment of the present invention. FIG. 1 is a flow diagram including a crushing step, grinding step and product separating step.

In the crushing step, concrete waste lumps B produced in a construction site are carried by a truck k, and thrown into a concrete hopper 10 by a shovel S or the like. Then, the concrete waste lumps B are conveyed by a recipro-feeder 12 and thrown into a jaw crusher 14. The jaw crusher 14 has a fixed plate 16 and a movable plate 18 which is reciprocated by a rotating body 20 towards the fixed plate 16. The concrete waste lumps B thrown are crushed between the fixed plate 16 and the movable plate 18 and sorted by a vibrating screen 22 into a mixture of sand and cement having diameters of less than 5 mm and a mixture of gravel and crushed stones having diameters of greater than 5 mm. The mixture of gravel and crushed stones is fed to a grinding device 24 and the mixture of sand and cement is fed to a grinding device 26.

The mixture of gravel and crushed stones can be further sorted by nets or the like into several kinds of mixtures by diameter thereof, for example, one being greater than 30 mm and less than 60 mm, another being greater than 60 mm and less than 100 mm and still another being greater than 100 mm, and fed to a plurality of grinding devices, respectively. Gravel and crushed stones of diameters which are unnecessarily great are removed.

Next, in the grinding step, rod mill type grinding devices 24 and 26 are provided. As shown in FIG. 2, the grinding device 24 includes a tubular rotary main body 28 having an inlet opening 30 and an outlet opening 32 which are respectively formed in axial end faces of the main body 28 in facing relationship, and a plurality of rods 34 movably disposed within the main body 28. The preferred total volume of the rods 34 ranges from 10 to 20% of the volume of the inside of the main body 28. The cylindrical side wall of the main body 28 is tapered towards the outlet opening 32 such that the diameter of the main body 28 decreases towards the outlet opening 32.

The grinding device 24 further includes an adjusting plate 36 which is movably attached along the outlet opening 32 to vary the opening area thereof.

Along an outer face of the side wall of the main body 28, a pair of ring-like members 38 are integrally formed. These ring-like members 38 are driven by drive wheels 40 having a cushion property at a predetermined speed. Furthermore, wheels (not shown) composed of tires are provided in abutment with the side parts of the ring-like members 38 to axially and rotatably support the main body 28.

The gravel and crushed stones sorted in the crushing step are thrown with water into the grinding device 24 from the inlet opening 30. The main body 28 is rotated by the drive wheels 40 through the ring-like members 38 at the predetermined speed. Due to the rotation of the main body 28, gravel and crushed stones rotate along an inner face of the main body 28, and the plurality of rods 34 repeatedly move upwardly along the inner face of the main body 28 and drop, whereby gravel and crushed stones are ground between the inner face of the rotating main body 28 and the plurality of rods 34 to peel mortar from the gravel and crushed stones. The grinding step is carried out under such conditions that gravel and crushed stones do not collide violently with each other but merely abut each other so that the crush thereof can be restrained to a minimum.

The ground gravel and crushed stones are fed from the outlet opening 32 of the grinding device 24 together with mortar. At this time, by moving the adjusting plate 36 in accordance with the dimensions of the gravel and crushed stones, the opening area of the outlet opening 32 is adjusted to set the grinding time enough to peel mortar from the gravel and crushed stones completely. Outside the outlet opening 32 of the grinding device 24, a trommel revolving screen 42 having a wire net-like sieve 44 is provided. The sieve 44 sorts a mixture of sand and cement from the mixture of ground gravel, crushed stones and mortar.

Since the side wall of the main body 28 is tapered to the outlet opening 32, the gravel and crushed stones thrown into the main body 28 can readily move towards the outlet opening 32, and can properly stay near the outlet opening 32 to enable the uniform grinding of the gravel and crushed stones.

The grinding device 26 (FIG. 1) has a construction substantially identical to that of the grinding device 24. The mixture of sand and cement sorted by the wire net-like sieve 44 is thrown with the mixture of sand and cement passing the vibrating screen 22 into the grinding device 26, and ground together similarly to the grinding device 24 to peel mortar from sand.

In the grinding devices 24 and 26, rods 34 are used. Alternatively, balls made of iron or other metal will do. Furthermore, these rods or balls are not always needed within the main body 28. In this case, gravel and crushed stones are rotated under such conditions as not to crush them with each other.

In the product separating step, the mixture of gravel, crushed stones and mortar fed from the grinding device 24 is thrown into a gravity sorting device 46 (FIG. 1). As shown in FIG. 3, the gravity sorting device 46 has a fixed water tank 48 which are partitioned with a punching plate 50 into an upper part and a lower part, and a movable water tank 52 which is separated from the fixed water tank 48 with a rubber diaphragm 54. The punching plate 50 slightly inclines downwards from an inlet position 56 towards an outlet opening 58. Under the movable water tank 48, a driving member 60 which is driven by a high speed main motor 62 and a low speed sub motor 64 is provided.

The mixture of gravel, crushed stones and mortar is thrown into the fixed water tank 48 from the inlet position 56. The driving member 60 driven by the high speed main motor 62 and the low speed sub motor 64 vibrates the water within the movable water tank 52. The vibrations of the water within the movable water tank 52 is transmitted to the water within the fixed water tank 48 through the rubber diaphragm 54. Due to the vibrations of the water within the fixed water tank 48, the mixture of gravel, crushed stones and mortar thrown into the fixed water tank 48 is moved towards the outlet side 58 while being separated with the punching plate 50 into high gravity gravel and crushed stones below the punching plate 50 and low gravity mortar thereabove. Thus, as shown in FIG. 1, gravel and crushed stone J, mortar M and water W are separated from each other and discharged from the outlet opening 58 and a lower outlet opening (not shown).

In FIG. 1, the mixture of sand, cement and mortar, which is fed from the grinding device 26 is thrown into a spiral classifier 66, and separated with the rotation of spiral vanes into sand N and powdery cement. The powdery cement is thickened with water fed from the gravity sorting device 46 by a thickener 68. And extra water W is separated from water-including cement T and fed again to the gravity sorting device 46.

With the first embodiment, in the grinding step, mortar can be removed from sand, gravel and crushed stones by the grinding devices 24 and 26 with certainty, which enables the reclaim of high quality sand, gravel and crushed stones. In addition, the product separating step can be carried out with certainty by means of the gravity sorting device and spiral classifier.

The following tables show one experimental result of the reclaimed aggregate in accordance with the first embodiment. For comparison, characteristics of the reclaimed aggregate I in "Provisional Standard of Use of Recycle of Concrete by-product (draft)" enacted by the Ministry of Construction of Japan in April, 1995, and those of crushed stones for concrete in JISA5005-1993 are also shown.

TABLE 1

| | first embodiment | Standard of Ministry of Construction | JISA5005-1993 |
| --- | --- | --- | --- |
| water absorption (%) | 1.8 ~ 2.5 | less than 3 | less than 3 |
| soundness (%) | 4.0 ~ 7.8 | less than 12 | less than 12 |
| content of materials passing 75 µm standard sieve (%) | 0.4 ~ 0.7 | less than 1.5 | less than 1.0 |
| specific gravity in oven dried condition | 2.51 ~ 2.53 | — | more than 2.5 |

TABLE 2

| | first embodiment | Standard of Ministry of Construction | JISA5005-1993 |
| --- | --- | --- | --- |
| abrasion loss (%) | 16 ~ 21 | — | less than 40 |
| solid content (%) | 57 ~ 60 | — | more than 55 |

As is apparent from the tables, all of the characteristics of the reclaimed aggregate in accordance with the first embodiment are superior to those of both the Standard of the Ministry of Construction and JISA5005-1993.

Figure 4:
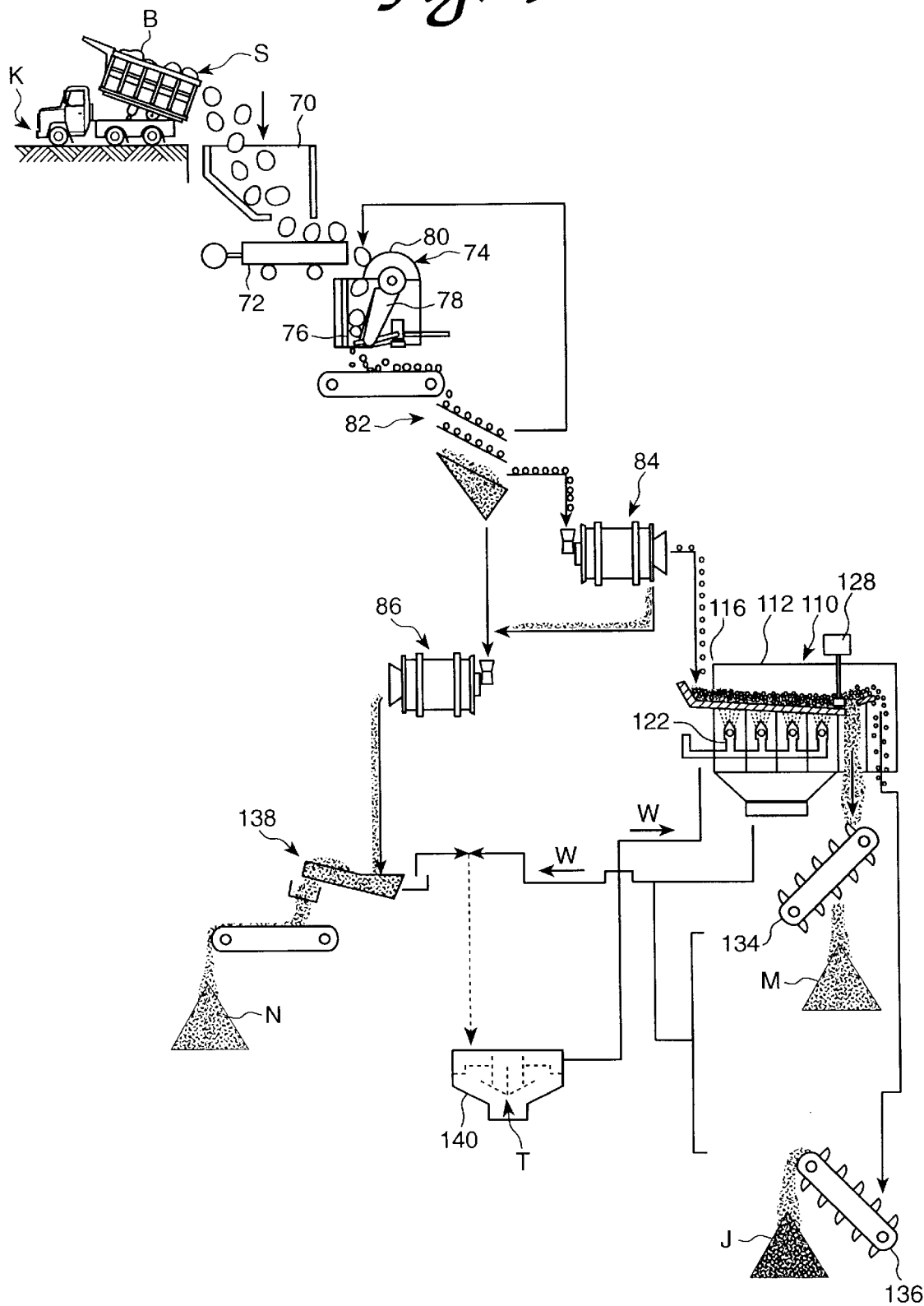
FIG. 4 is a flow diagram illustrating a second embodiment of a method and system in accordance with the present invention.

FIGS. 4 to 7 illustrate a second embodiment of the present invention. FIG. 4 is a flow diagram including a crushing step, grinding step and product separating step.

The crushing step is substantially identical to that of the first embodiment. Concrete waste lumps B produced in a construction site are carried by a truck k, and thrown into a concrete hopper 70 by a shovel S or the like. Then, the concrete waste lumps B are conveyed by a recipro-feeder 72 and thrown into a jaw crusher 74. The jaw crusher 74 has a fixed plate 76 and a movable plate 78 which is reciprocated by a rotating body 80 towards the fixed plate 76. The concrete waste lumps B thrown are crushed between the fixed plate 76 and the movable plate 78 and sorted by a vibrating screen 82 into a mixture of sand and cement having diameters of less than 5 mm and a mixture of gravel and crushed stones having diameters of greater than 5 mm. The mixture of gravel and crushed stones is fed to a grinding device 84 and the mixture of sand and cement is fed to a grinding device 86.

The mixture of gravel and crushed stones can be further sorted by nets or the like into several kinds of mixtures by diameter thereof, for example, one being greater than 30 mm and less than 60 mm, another being greater than 60 mm and less than 100 mm, still another being greater than 100 mm, and fed to a plurality of grinding devices, respectively. Gravel and crushed stones of diameters which are unnecessarily great are removed.

Figure 5:
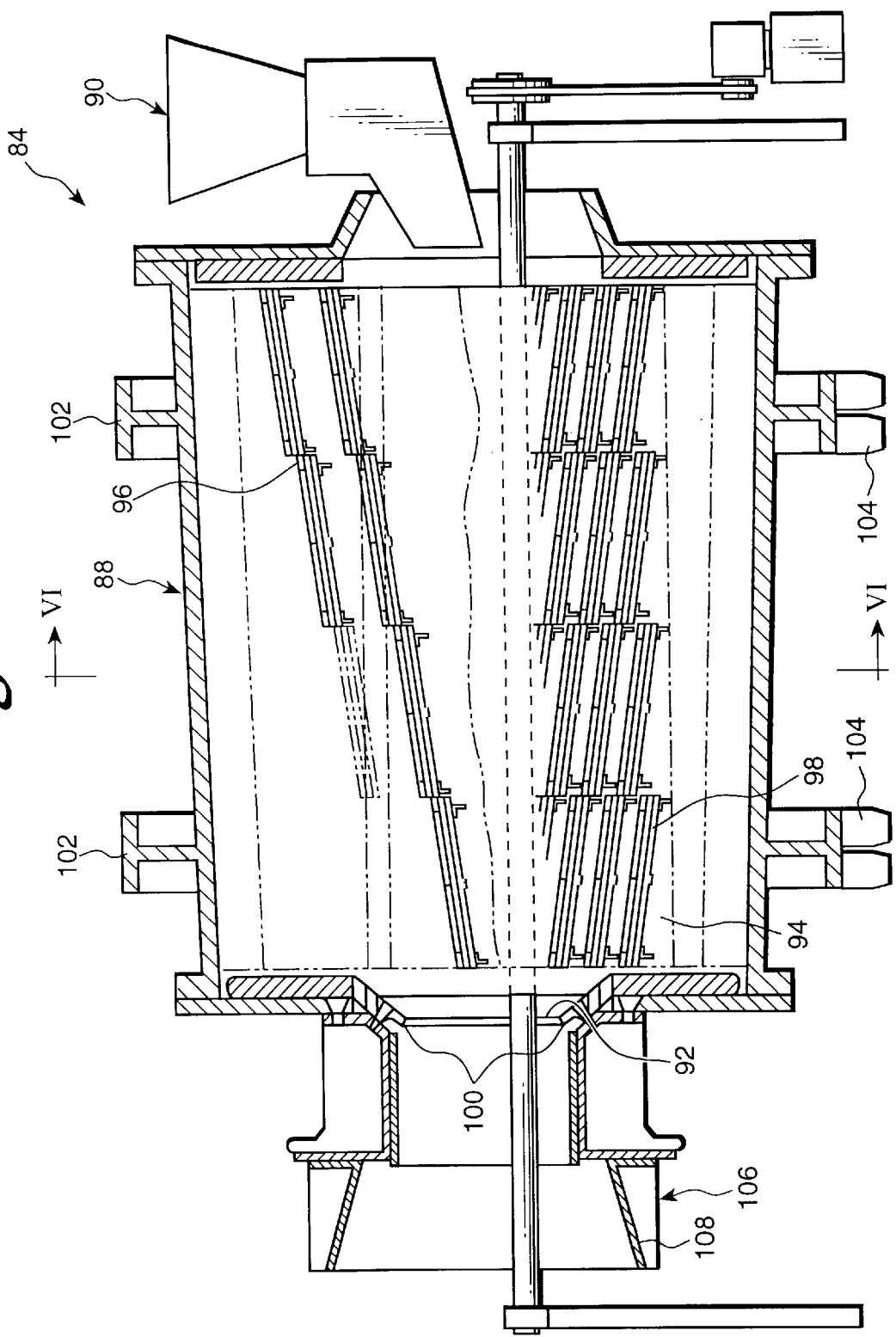
FIG. 5 is a partly broken side elevational view of a grinding device used in the second embodiment.
Figure 6:
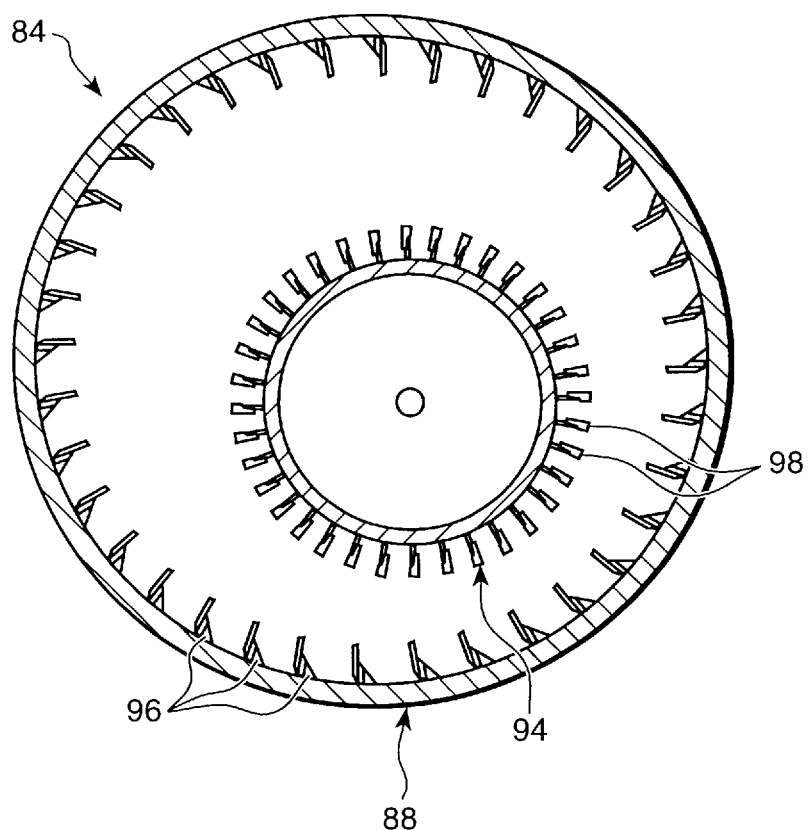
FIG. 6 is a cross-sectional view taken along the line VI—VI of FIG. 5.

Next, in the grinding step, cylindrical grinding devices 84 and 86 are provided. As shown in FIG. 5, the grinding device 84 includes a tubular rotary main body 88 having an inlet opening 90 and an outlet opening 92 which are respectively formed in axial end faces of the main body 88 in facing relationship, and a rotary body 94 which is disposed within the main body 88 in eccentric relation therewith so as to rotate in a direction opposite to that of the main body 88 at a predetermined speed. The main body 88 has along its inside face a large number of longitudinally extending plate-shaped projections 96, and the rotary body 94 has along its outside face a large number of longitudinally extending plate-shaped projections 98 so as to face the projections 96 of the main body 88. The cylindrical side wall of the main body 88 is tapered towards the outlet opening 92 such that the diameter of the main body 88 decreases towards the outlet opening 92. The grinding device 84 further includes an adjusting plate 100 which is movably attached along the outlet opening 92 to vary the opening area thereof.

Along an outer face of the side wall of the main body 88, a pair of ring-like members 102 are integrally formed. These ring-like members 102 are driven by drive wheels 104 having a cushion property at a predetermined speed. Furthermore, wheels (not shown) composed of tires are provided in abutment with the side parts of the ring-like members 102 to axially and rotatably support the main body 88.

The gravel and crushed stones crushed in the crushing step is thrown with water into the grinding device 84 from the inlet opening 90. By rotating the main body 88 and the grinding member 94 in opposite directions with the drive wheels 104 through the ring-like members 102 at determined speeds, the mixture of gravel and crushed stones thrown are rotated along the inner face of the main body 88 and ground between the projections 96 and 98 while moving towards the outlet opening 92. Since the rotary body 94 is in eccentric relation with the main body 88, the grinding space between the rotary body 94 and the main body 88 varies to vary the compression forces of the projections 96 and 98 against gravel and crushed stones. The compression forces thereof become the maximum in the narrowest grinding space therebetween. Due to the rotation of gravel and crushed stones through the narrow grinding space wherein compression forces vary, mortar is peeled from gravel and crushed stones with the improved grinding performance. In this narrow grinding space, the gravel and crushed stones are ground with each other, too. The grinding step is carried out under such conditions that gravel and crushed stones do not collide violently with each other and with the projections 96 and 98 but merely abut each other and the projections 96 and 98 so that the crush of the gravel and crushed stones can be restrained to a minimum.

In FIG. 5, the projections 96 and 98 respectively extend longitudinally into differently included configurations. With this arrangement, gravel and crushed stones can be readily moved to the outlet opening 92. Alternatively, one or both of the projections 96 and 98 may be extend longitudinally along an axis of the main body 88 and the rotary body 94, respectively. With this arrangement, the staying time of gravel and crushed stones within the main body 88 can be prolonged to provide a compact main body having a shorter axial length.

The ground gravel and crushed stones are fed from the outlet opening 92 of the grinding device 84 together with mortar. At this time, by moving the adjusting plate 100 in accordance with the dimensions of gravel and crushed stones, the opening area of the outlet opening 92 is adjusted to set the grinding time enough to peel mortar from the gravel and crushed stones completely.

Outside the outlet opening 92 of the grinding device 84, a trommel revolving screen 106 having a wire net-like sieve 108 is provided. The sieve 108 sorts a mixture of sand and cement from the mixture of ground gravel, crushed stones and mortar.

Since the side wall of the main body 88 is tapered to the outlet opening 92, the gravel and crushed stones thrown into the main body 88 can readily move towards the outlet opening 92, and can properly stay near the outlet opening 92 to enable the uniform grinding of the gravel and crushed stones.

The grinding device 86 (FIG. 4) has a construction substantially identical to that of the grinding device 84.

The mixture of sand and cement sorted by the wire net-like screen 108 is thrown with the mixture of sand and cement passing the vibrating screen 82 into the grinding device 86, and ground together similarly to the grinding device 84 to peel mortar from sand. Then, a mixture of sand, cement and mortar is fed from the grinding device 86.

Figure 7:
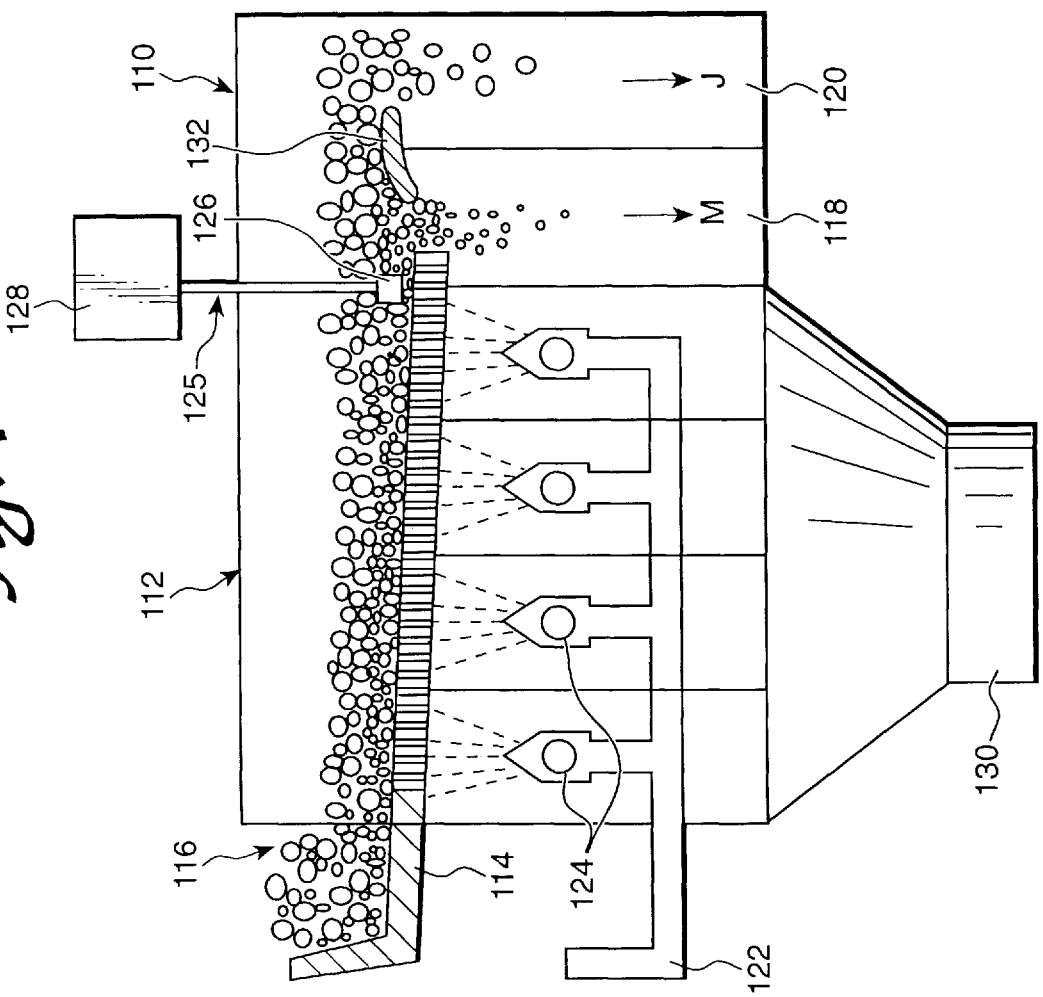
FIG. 7 is a side elevational view of a pressure sorting device used in the second embodiment.

In the product separating step, as shown in FIG. 4 the mixture of gravel, crushed stones and mortar, which is fed from the grinding device 84 is thrown into a pressure sorting device 110. As shown in FIG. 7, the pressure sorting device 110 has a main body 112 where a conveyor plate 114 having a lattice-like configuration is provided so as to incline slightly downwards from an inlet position 116 to outlet openings 118 and 120. Under the conveyor plate 114, a water pipe 122 and air pipes 124 interconnected with ends of the water pipe 122 are provided to inject compressed air with water towards the conveyor plate 114. Above the conveyor plate 114, a parting device 124 composed of a float section 126 adapted to make the upper level of the mixture of gravel, crushed stones and mortar uniform and part the mixture into gravel and crushed stones J and mortar M, and a control section 128 adapted to control the height of the float section 126 in accordance with the condition of the above mixture. Reference numeral 130 denotes a drain pan adapted to receive water and sand from the conveyor plate 114.

The mixture of gravel, crushed stones and mortar from the grinding device 84 is thrown into the pressure sorting device 110 from the inlet position 116 and conveyed by the convey plate 114 within the main body 112. During conveying, pressure is applied to the above mixture by the air with water injected from the air pipe 124 to sort the above mixture by density and gravity thereof into an upper layer of gravel and crushed stones and a lower layer of mortar. Then, these upper and lower layers are parted by the parting device 125 on the conveyor plate 114. Then, the gravel and crushed stones J move along a guide plate 132 and drop down from the outlet opening 120, and mortar M drops down from the outlet opening 118, thus separating gravel and crushed stones, mortar and water from each other.

Next, water included in the thus sorted mortar and gravel and crushed stones are respectively drained off by bucket conveyors 134 and 136 (FIG. 4).

In FIG. 4, the mixture of sand, cement and mortar fed from the grinding device 86 is thrown into a spiral classifier 138, and sorted with the rotation of spiral vanes into sand N and a mixture of mortar and powdery cement.

The powdery cement is thickened by a thickener 140 with water fed from the pressure sorting device 110 and bucket conveyors 134 and 136, and extra water is separated from water-including cement T and is again fed to the pressure sorting device 110.

With the second embodiment, in the grinding step, mortar can be removed from the aggregate by the grinding devices 84 and 86 with certainty while restraining the crush of the gravel and crushed stones to a minimum. This enables reclamation of high quality sand, gravel and crushed stones. The product separating step can be carried out with certainty by means of the pressure sorting device 110 and the spiral classifier 138.

The experimental result of the reclaimed aggregate in accordance with the second embodiment is substantially identical to that of the first embodiment shown in the above tables. This result shows that the qualities of the reclaimed aggregate from concrete waste material are considerably superior to those of both the above described Standard and JIS.

With the method and system of the present invention, which includes the crushing step and means of compression-crushing concrete waste lumps and sorting a resultant crushed mixture, the grinding step and means of grinding crushed and sorted mixture to peel mortar from gravel, crushed stones, sand, and the product separating step and means of separating gravel and crushed stone, sand, mortar or the like, high quality aggregate free from a large amount of mortar attachment, which conforms to the legal standard, can be reclaimed.

In the grinding step and means of the present invention, aggregate such as sand, gravel and crushed stones abut each other and the grinding member while being rotated along the inner face of the main body. Therefore, as compared to the conventional dry-crumbling technique, the grinding of aggregate can be carried out over a wide outer face thereof, which enables the effective peeling of mortar therefrom.

Furthermore, since the grinding step and means of the present invention is carried out in a wet state and under such conditions that aggregate do not collide violently with each other and the grinding member, the crush of aggregate can be restrained to a minimum, and the grinding performance is improved, which enables the substantially complete peel of mortar from aggregate and the reclamation of high quality aggregate.

In addition, in the grinding step, a plurality of grinding devices can be used according to the sizes of aggregate. With this arrangement, mortar can be peeled with greater certainty, and aggregate free from mortar attachment can be obtained.

In the product separating step, the gravity sorting device, pressure sorting device and spiral classifier effect the substantially complete separation of sand, gravel and crushed stones, and mortar from each other enough to reclaim high quality aggregate.

Since the first separating step is carried out based on the difference in gravity, the certain product separation can be effected as compared to the conventional methods using screens. With the arrangement that a plurality of gravity sorting devices and/or pressure sorting devices are used in series, the sorting effect is further improved.

In the preceding embodiments, the side walls of the main bodies 28 and 88 of the grinding devices 24, 26, 84 and 86 are tapered. The side walls of the main bodies 28 and 88 need not necessarily be tapered.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A system for reclaiming aggregate from concrete waste material comprising:

crushing means of compression-crushing lumps of said concrete waste material into a crushed mixture, and sorting said crushed mixture by size thereof;

grinding means of rotating said crushed mixture sorted to grind said crushed mixture, thereby peeling mortar from aggregate included in said crushed mixture to obtain a mixture of aggregate and mortar, and sorting said mixture of aggregate and mortar into a mixture of gravel, crushed stones and mortar and a mixture of sand, cement and mortar; and product separating means for separating said mixture of gravel, crushed stones and mortar and said mixture of sand, cement and mortar into products including gravel and crushed stones, sand, cement, and mortar.

2. The method as claimed in claim 1, wherein said crushing means sorts said crushed mixture into a mixture of gravel and crushed stones and a mixture of sand and cement, said grinding step includes first grinding means of rotating said mixture of gravel and crushed stones crushed and sorted in said crushing means to grind said mixture, thereby peeling mortar from gravel and crushed stones, and second grinding means of rotating said mixture of sand and cement crushed and sorted by said crushing means to grind said mixture, thereby peeling mortar from sand.

3. The system as claimed in claim 1, wherein said product separating means includes first separating means of separating said mixture of gravel, crushed stones and mortar into gravel, crushed stones and mortar, and second separating means of separating said mixture of sand, cement and mortar into sand, cement and mortar.

4. The system as claimed in claim 3, wherein said first product separating means is composed of at least one gravity sorting device which separates said mixture of gravel, crushed stones and mortar based on the difference in gravity therebetween by applying vibrations.

5. The system as claimed in claim 3, wherein said first product separating means is composed of at least one pressure sorting device which separates said mixture of gravel, crushed stones and mortar based on the difference in gravity therebetween by applying pressures.

6. The system as claimed in claim 1, wherein said grinding means is composed of at least two grinding devices, each having a tubular rotary main body.

7. The system as claimed in claim 6, wherein said tubular rotary main body has an inlet opening and an outlet opening at axially facing positions thereof, and a cylindrical side wall thereof is tapered to said outlet opening such that the diameter of said tubular rotary main body decreases towards said outlet opening.

8. The system as claimed in claim 6, wherein said tubular rotary main body has an inlet opening and an outlet opening at axially facing positions thereof, and an adjusting plate capable of varying the opening area of said outlet opening is provided along said outlet opening.

9. The system as claimed in claim 6, wherein each of said at least two grinding devices further has a grinding member movably provided within said tubular rotary main body.

10. The system as claimed in claim 9, wherein said grinding member is one of rods and balls.

11. The system as claimed in claim 10, wherein said grinding member is a rotary body provided within said tubular rotary main body in eccentric relation therewith so as to rotate in a direction opposite to that of said tubular rotary main body, said rotary body has along an outside face thereof a plurality of longitudinal extending plate-shaped projections which respectively face a plurality of longitudinal extending plate-shaped projections formed along an inside face of said tubular rotary main body.

12. The system as claimed in claim 1, wherein said second product separating means is composed of a spiral classifier of separating sand, cement and mortar from each other by rotating spiral vanes of said spiral classifier.

* * * * *